US012597822B2

(12) United States Patent
Dawson et al.

(10) Patent No.: US 12,597,822 B2
(45) Date of Patent: Apr. 7, 2026

(54) STATOR ASSEMBLY

(71) Applicant: Hamilton Sundstrand Corporation, Charlotte, NC (US)

(72) Inventors: Michael James Dawson, Bristol (GB); Parminder Sangha, Solihull (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 210 days.

(21) Appl. No.: 18/523,313

(22) Filed: Nov. 29, 2023

(65) Prior Publication Data

US 2024/0178715 A1 May 30, 2024

(30) Foreign Application Priority Data

Nov. 29, 2022 (EP) ..................................... 22210371

(51) Int. Cl.
| *H02K 3/48* | (2006.01) |
| *H02K 15/021* | (2025.01) |
| *H02K 15/062* | (2025.01) |

(52) U.S. Cl.
CPC ............. *H02K 3/48* (2013.01); *H02K 15/021* (2025.01); *H02K 15/062* (2013.01)

(58) Field of Classification Search
CPC .. H02K 3/34; H02K 3/24; H02K 3/48; H02K 15/062; H02K 15/021
See application file for complete search history.

(56) References Cited

U.S. PATENT DOCUMENTS

| 3,519,862 | A | * | 7/1970 | Walker | ..................... | H02K 3/48 |
| | | | | | | 310/214 |
| 3,940,647 | A | * | 2/1976 | Keuper | .................. | H02K 3/487 |
| | | | | | | 310/214 |
| 6,188,158 | B1 | | 2/2001 | DeLuca et al. | | |
| 11,258,338 | B2 | * | 2/2022 | Weber | ...................... | H02K 5/08 |

(Continued)

FOREIGN PATENT DOCUMENTS

| CN | 102624125 | B | 1/2016 |
| EP | 3820025 | A1 | 5/2021 |

(Continued)

OTHER PUBLICATIONS

1 European Office Action for Application No. 22210371.5, mailed Dec. 17, 2024, 9 pages.

(Continued)

*Primary Examiner* — Leda T Pham
(74) *Attorney, Agent, or Firm* — CANTOR COLBURN LLP

(57) ABSTRACT

A stator assembly for an electrical machine extends azimuthally around an axis. The assembly includes: a plurality of stator teeth projecting radially from a circumference of the stator assembly, wherein the teeth are spaced azimuthally from each other and extend along a direction parallel to the axis of the stator assembly; a plurality of slots defined by azimuthal spacing of the stator teeth, wherein the plurality of slots extends along a direction parallel to the axis of the stator assembly, wherein the slots are arranged to receive a plurality of stator windings; and one or more dividers positioned within the plurality of slots, wherein the dividers define a plurality of cavities for receiving the plurality of stator windings.

14 Claims, 5 Drawing Sheets

(56)         References Cited

U.S. PATENT DOCUMENTS

| | | | | |
|---|---|---|---|---|
| 2012/0194028 A1* | 8/2012 | Rhoads | ................... | H02K 3/34 |
| | | | | 310/215 |
| 2015/0028716 A1* | 1/2015 | Zook | ..................... | H02K 3/345 |
| | | | | 310/215 |
| 2021/0143701 A1 | 5/2021 | Sangha et al. | | |
| 2022/0200367 A1* | 6/2022 | Sangha | ................... | H02K 3/12 |

FOREIGN PATENT DOCUMENTS

| | | | |
|---|---|---|---|
| JP | S5124683 | B1 | 7/1976 |
| JP | S5343803 | A | 4/1978 |
| KR | 101815794 | B1 | 1/2018 |
| WO | 2021032238 | A1 | 2/2021 |
| WO | 2021229888 | A1 | 11/2021 |

OTHER PUBLICATIONS

Abstract of JPS5343803 (A), Published: Apr. 20, 1978, 1 page.
European Search Report for Application No. 22210371.5, mailed May 10, 2023, 12 pages.

* cited by examiner

STATOR ASSEMBLY

CROSS REFERENCE TO RELATED APPLICATIONS

This application claims priority to European Patent Application No. 22210371.5 filed Nov. 29, 2022, the entire contents of which is incorporated herein by reference.

FIELD OF TECHNOLOGY

The examples described herein relate to a stator assembly for an electrical machine, in particular a stator assembly that is configured to position the stator windings.

BACKGROUND OF THE INVENTION

Electric generators or motors comprise a stator and a rotor. The stators comprise many stator windings, which may consist of single or multiple conductors, single or multiple turns in a coil and with several coils connected in series or parallel. However, it is quite difficult to control the position of the windings in the slots between the stator teeth. The windings, if unconstrained, may spread out during and after being placed in the stator, such that they touch. This can cause degradation of the wire insulation which over time can cause shorting, leading to overheating of the motor.

The motor may be cooled by applying liquid cooling to the stator, however it is also difficult to arrange suitable cooling channels around the stator windings. There is therefore a need for an improved stator assembly and method for positioning and cooling stator windings.

SUMMARY OF THE INVENTION

According to this disclosure, there is provided a stator assembly for an electrical machine. The stator assembly extends azimuthally around an axis, wherein the stator assembly comprises of a plurality of stator teeth projecting radially from a circumference of the stator assembly. The teeth are spaced azimuthally from each other and extend along a direction parallel to the axis of the stator assembly. The stator assembly also includes a plurality of slots defined by azimuthal spacing of the stator teeth. The plurality of slots extends along a direction parallel to the axis of the stator assembly, wherein the slots are arranged to receive a plurality of stator windings. The stator assembly also includes one or more dividers positioned within the plurality of slots, wherein the dividers define a plurality of cavities for receiving the plurality of stator windings.

Also, according to this disclosure, there is provided a method of assembling a stator assembly for an electric machine. The includes providing a plurality of stator teeth projecting radially from a circumference of the stator assembly. The teeth are spaced azimuthally from each other and extend along a direction parallel to the axis of the stator assembly, the azimuthal spacing of the plurality of stator teeth defines a plurality of slots, and the plurality of slots extends along a direction parallel to the axis of the stator assembly. The method further includes: positioning one or more dividers within the plurality of slots, wherein the dividers define a plurality of cavities; and inserting a plurality of stator windings into the plurality of cavities, before, during or after the positioning of the one or more dividers. The plurality of dividers substantially separates the plurality of stator windings.

It will be appreciated that all of the features described herein relating to the stator assembly apply equally to the method of assembling the stator, and vice versa.

The stator assembly, of an electrical machine, which extends azimuthally (e.g., fully circumferentially) around a longitudinal axis, has a plurality of stator teeth, on which windings of an electromagnetic coil can be mounted. The stator assembly is substantially axially symmetric about its longitudinal axis. In one example, the stator assembly is generally cylindrical.

In some examples, the plurality of stator teeth projects radially inwards (e.g., from an inner circumference of the stator assembly), optionally when the electric motor comprises an inner rotor. In some examples, the plurality of the stator teeth projects radially outwards, (e.g., from an outer circumference of the stator assembly), optionally when the electric motor comprises an outer rotor.

The stator teeth are spaced (e.g., evenly) azimuthally from each other (around the axis of the stator assembly), i.e., there is a gap between (e.g., each pair of) adjacent teeth. This results in slots between the stator teeth, also extending (e.g., radially inwardly and) along a direction parallel to the stator assembly. In an example, the slots comprise a plurality of stator windings. Each slot of the plurality of stator teeth may be arranged for mounting a winding of an electromagnetic coil (or portion thereof).

In some examples, the stator tooth or each of the plurality of stator teeth extends in an axial direction (parallel to the axis of the stator assembly). In some examples the stator tooth or each of the plurality of stator teeth has a substantially constant cross section (in a plane perpendicular to the axis of the stator assembly).

In some examples, the stator assembly comprises a plurality of dividers positioned within the plurality of slots. Each slot may have an associated divider or plurality of dividers positioned within the slot, where the divider(s) divide the slot into a plurality of cavities.

In an example, the cavities are defined in the slot by the divider(s), forming portions of the volume of the slot. In an example, the one or more dividers (e.g., in each slot) are arranged to form radially spaced cavities in the slot. When a (e.g., each) slot contains a plurality of dividers, in an example the dividers are spaced radially within the slot, thus forming a plurality of radially spaced cavities.

In an example, each of the plurality of cavities contains a respective stator winding (or bundle of stator windings) of the plurality of stator windings. By placing the stator windings in individual cavities, separated by a divider, this holds each (e.g., bundle of) stator windings in position, and prevents adjacent (e.g., bundles of) stator windings from touching.

In an example, the stator windings are made from multistranded conductors. These stator windings provide more flexibility when being bent around the stator, however their size and shape can deform during the installation process. If unconstrained, the windings can spread out during and after being placed in the stator, causing the windings to touch and rub against each other.

Over time, the insulation of the wires making up the windings can degrade owing to temperature cycling, mechanical operation (e.g., vibrations), leading to turn to turn or phase to phase faults in the windings. This causes shorting between windings, which can lead to overheating of the motor. Therefore, it may be advantageous to hold the stator windings in position within the cavities in order to prevent them touching, as it prevents degradation of the insulation of the wires. This may allow the electric machine to be run more efficiently.

In an example, the (e.g., each) divider comprises a panel extending longitudinally along the axis of the stator assembly. In an example, the (e.g., each) divider has substantially the same length as the axial length of the stator. In an example the (e.g., each) divider has substantially the same width (azimuthal extent) as the slot defined by the gap between pairs of stator teeth, or in another example is smaller than this width. In another example, the (e.g., each) divider has a radial extent significantly smaller than its width.

In some examples, the (e.g., each) divider is T-shaped, comprising a body portion and an end portion. The body portion of the (e.g., each) divider extends longitudinally along the axis of the stator assembly, and the end portion is perpendicular to the body portion. The body portion of the divider may be positioned in the slots formed between the stator teeth. The end portion of the divider may be positioned externally to the slots formed by the stator teeth, e.g., the end portion of the divider projects out of the end of the slot such that it can be located by another component, e.g., an end cheek.

In an example, the length of the body portion of the (e.g., each) divider is substantially the same length as the axial length of the stator such that it extends along the full axial extent of the stator. In another example, the (e.g., each) divider extends along approximately half the axial length of the stator. In this example, dividers may be inserted from both ends of the stator, which eases assembly.

In an example, a (e.g., each) slot comprises two dividers that extend along approximately half the axial length of the stator. In an example, the pair of dividers have any ratio of lengths such that the total length of both dividers is substantially the same length as the axial length of the stator. In an example, the ratio of the lengths of the pair of dividers is approximately 1:2, or approximately 1:3, again such that the total length of both dividers is substantially the same length as the axial length of the stator.

The two dividers may be inserted from both ends of the stator, such that a divider is inserted into each end of each slot formed by the stator teeth. In an example, when inserted at each end of each slot, the total length of the pairs of dividers is approximately the same as the axial length of the stator. In an example, the two dividers are arranged to meet with each other in the slot, wherein the distal ends of the body portions of the dividers contact each other in the slot.

In an example, the distal ends of the body portions of the dividers are arranged to engage with each other in the slot. For example, the distal ends of the body portions of the dividers may comprise grooves or cut-outs arranged such that the ends interlock or engage with one another where they meet in the slot. In an example, the distal ends of the body portions of the dividers are arranged to join together adhesively with each other in the slot. The joining or gluing of the dividers helps to prevent movement of the dividers and hence movement of the stator windings.

In an example, the width of the body portion of the (e.g., each) divider is substantially the same as the width of the slot. This helps to enable the stator windings to be held in position and helps to prevent a (e.g., bundle of) stator winding(s) touching a (e.g., bundle of) stator winding in any adjacent cavity, thus helping to prevent degradation of the insulation covering the windings.

In an example, the width of the body portion of the (e.g., each) divider is smaller than the width of the slot. This helps to enable adjacent (e.g., bundles of) stator windings to be sufficiently separated and positioned to prevent shorting. The divider(s) and slot are arranged to form one or more channels for the flow of coolant, which may help to efficiently cool the stator windings.

In some examples, the stator assembly comprises a spacer located within the (e.g., each) slot. In an example, the spacer is substantially wedge shaped, and lines the inside of the slot. In an example, the spacer extends substantially along the axial extent of the stator. This helps to prevent the stator windings wearing away at insulation surrounding the stator teeth, thus helping to prevent shorting. In an example, the insulation surrounding the stator teeth is comprised of a slot liner, which may provide insulation between the stator windings and the stator assembly.

In some examples, the (e.g., each) spacer defines one or more coolant channels which extend substantially along the axial extent of the stator. The coolant channel(s) may be arranged to control the flow of coolant around the stator windings. In an example, the spacer is used to locate the stator windings. This may allow for more efficient, directed cooling of the stator windings with a defined cooling cross-section.

In an example, a (e.g., bundle of) stator windings is positioned within a (e.g., each) cavity, wherein the cavity is formed by a spacer and at least one divider. In an example, the (e.g., each) stator winding is surrounded by the associated coolant channel(s) formed by the (e.g., each) spacer. In an example, the (e.g., each) dividers and/or the (e.g., each) spacer are shaped to define one or more coolant channels. This may help to direct the flow of coolant around the stator winding(s) in the (e.g., each) cavity.

In an example, the (e.g., each) divider is formed integrally with the (e.g., each) spacer, such that with the (e.g., each) slot, the divider(s) and spacer comprise a single component which is inserted into the (e.g., each) slot before, during, or after the positioning of the stator winding(s). This may ease the assembly of the motor.

In an example, the (e.g., each) divider is formed from an insulating material. In an example, this insulating material is a ceramic, plastic, or glass-composite. The use of an insulating material may help to prevent shorting of the stator, which may lead to overheating. In an example, the use of an insulating material for the (e.g., each) divider may help to prevent dielectric breakdown, which may allow the stator to be used at higher voltages.

In some examples, the stator assembly comprises one or more end cheeks. The (e.g., each) end cheek is positioned adjacent to (e.g., on) the (e.g., each) end face of the stator assembly. In an example, the (e.g., each) end cheek comprises a flat plate substantially congruent to the end face stator assembly (e.g., congruent to the shape of the stator teeth). In an example, the end cheek(s) comprise one or more openings, wherein the slots between the stator teeth are aligned with the openings in the (e.g., each) end cheek. This allows for the positioning of the (e.g., each) divider and the (e.g., each) stator winding in the (e.g., each) cavity formed by the (e.g., each) divider.

In an example, the width of the end portion of the (e.g., each) divider is wider than the width of the slot. This helps to enable the divider to be held in place within the slot, such that it is less likely to move out of the slot. In an example, this also helps to secure the end portion in an end face or end cheek of the stator.

The end cheeks may help to prevent any undue mechanical stresses on the stator windings from the formation of the end of the stator windings. This may help to prevent degradation of the insulation of the windings which may lead to electrical stress.

In an example, the (e.g., each) end cheek comprises one or more grooves, arranged to receive the one or more dividers. In an example, the (e.g., each) groove comprises a step partially cut out of a face of the (e.g., each) end cheek.

In an example, the (e.g., each) end of the (e.g., each) divider is arranged to engage with a complementary groove of the (e.g., each) end cheek.

In an example, the one or more dividers are T-shaped, wherein each divider comprises a body portion and an end portion. In an example, the end portion of the (e.g., each) divider is arranged to engage with a (respective) groove of the (e.g., each) end cheek. In an example, the end portion of the divider has substantially the same radial extent as the depth of the groove cut out of the end cheek.

In an example, when the (e.g., each) divider extends substantially along the axial length of the stator, the distal end of the body portion of the (e.g., each) divider is arranged to engage with a groove of the (e.g., each) end cheek. In an example, the (e.g., each) groove comprises a step complementary to the shape of the distal end of the body portion of the (e.g., each) divider.

In an example, when one or more dividers are T-shaped and extend approximately along half the axial length of the stator, the dividers are arranged to be inserted from both ends of the stator. In this example, the end portion of the (e.g., each) divider is arranged to engage with a groove of the (e.g., each) end cheek on an (e.g., each) end of the stator.

In an example, when the one or more dividers comprise longitudinally extending panels (i.e. with no end portion), the proximal and/or distal end of the (e.g., each) divider is arranged to engage with a groove of the (e.g., each) end cheek on an (e.g., each) end of the stator.

The arrangement of the end cheek(s) comprising groove(s) arranged to engage with the (e.g., each) divider may help to reduce the movement of the divider(s) within the (e.g., each) slot, which therefore helps to hold the stator windings in their desired position within the (e.g., each) cavity. This may help to prevent degradation of the insulation of the stator windings and the stator assembly.

BRIEF DESCRIPTION OF THE DRAWINGS

One or more non-limiting examples will now be described, by way of example only, and with reference to the accompanying figures in which.

DETAILED DESCRIPTION OF THE INVENTION

The examples described herein may be used for the separation of stator windings in aircraft electric propulsion applications. Other applications where a motor is flood cooled are, however, also envisaged and the examples are not limited to this.

Figure 1:
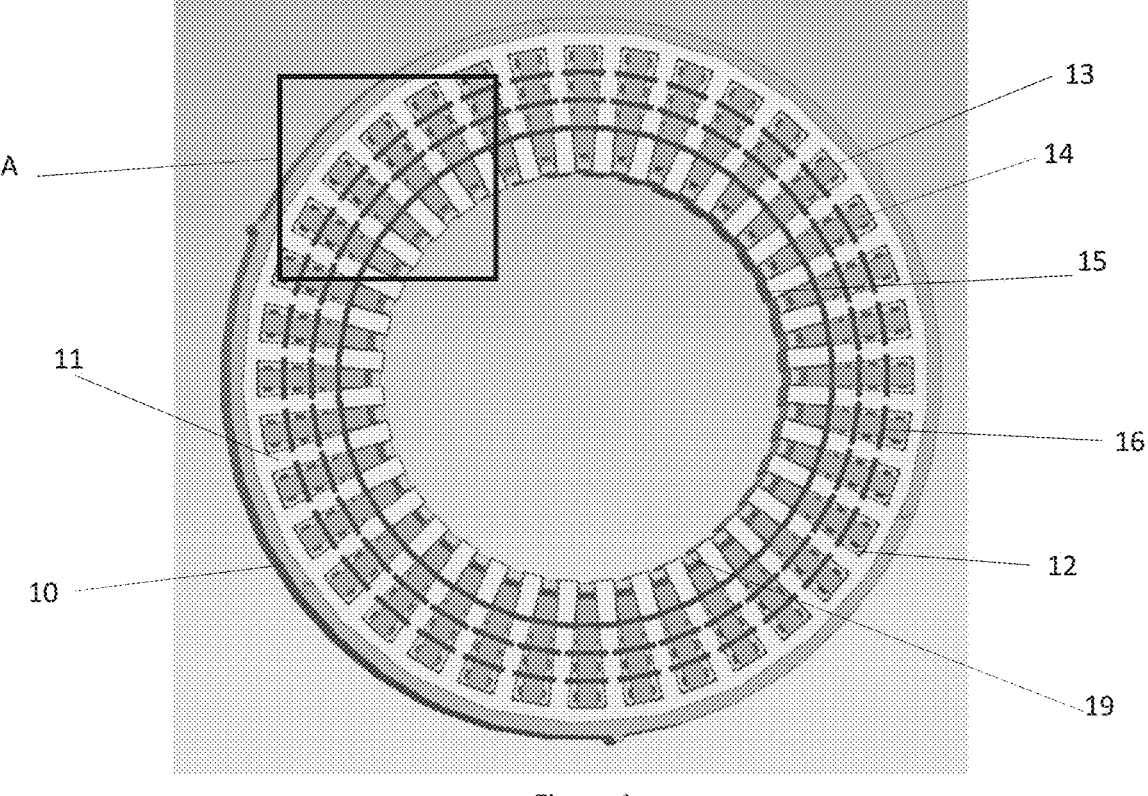
FIG. 1 shows a radial view of the end of a stator with end windings not shown.

FIG. 1 depicts an end-on view of a motor comprising a stator 10. The stator 10 comprises stator teeth 15 arranged to project radially inwards from the outer circumference of the stator 10. The stator body extends circumferentially around a rotor (not shown). The stator is azimuthally and axially symmetric. An end cheek 11 is placed at each end of the stator 10, which is cut around the end profile of the stator teeth.

The stator teeth form slots 13. Within the slots 13 are bundles of stator windings 14 arranged radially within the slot 13, and surrounding the stator windings 14 within the slots 13 are spacers 12. At the innermost radial point of each slot 13 is a position wedge 19, which helps to prevent the movement of the innermost stator winding bundle 14. In between bundles of stator windings 14 are dividers 16, where the dividers 16 are arranged to prevent radial contact between bundles of stator windings 14 along the axial extent of the stator.

Figure 2:
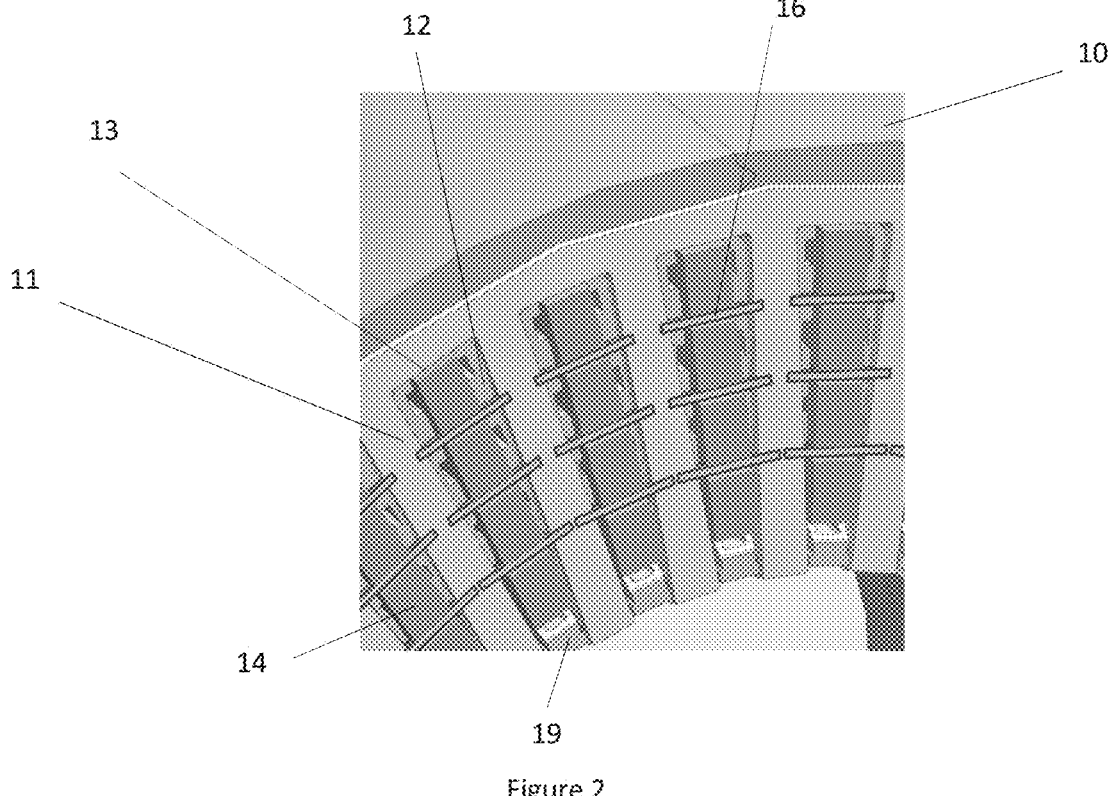
FIG. 2 shows a perspective view of an enlarged section of the stator in FIG. 1.
Figure 3:
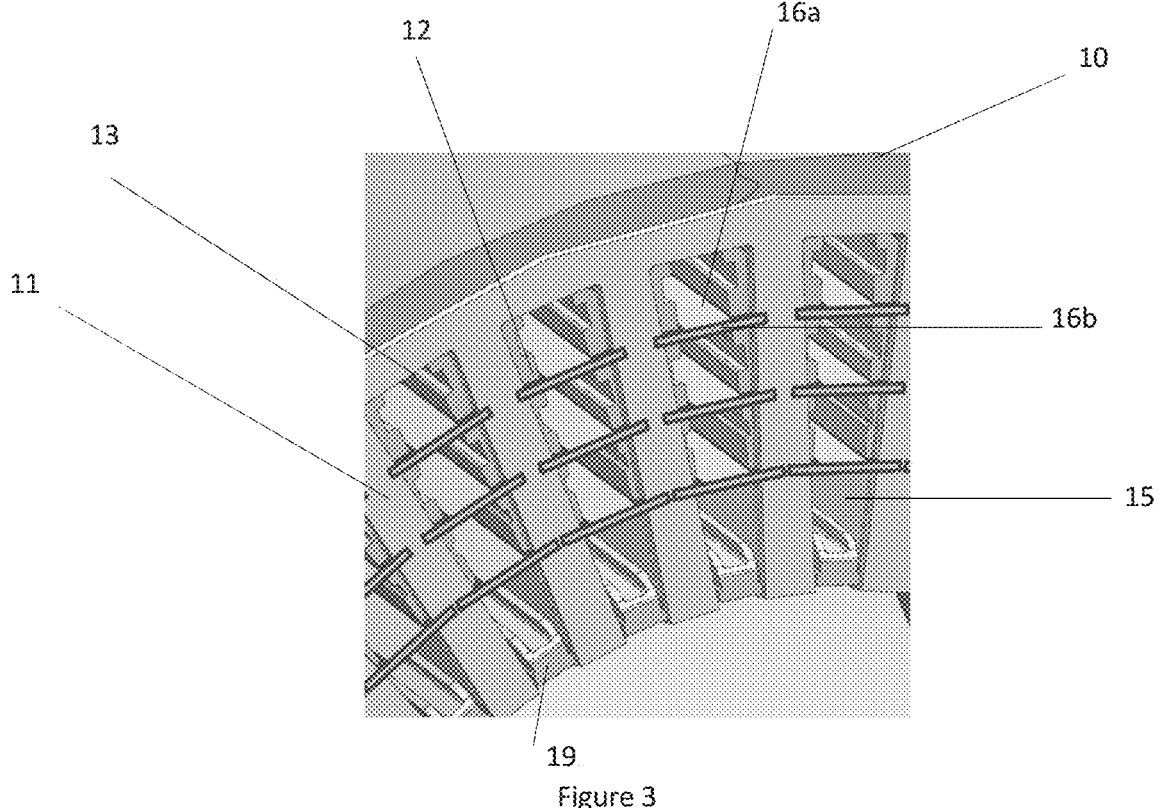
FIG. 3 shows a perspective view of the enlarged section of the stator in FIG. 2, with the stator windings removed.

FIG. 2 depicts an enlarged section A of FIG. 1. As can be seen in FIG. 2, each slot 13 may contain a plurality of dividers 16 which can be arranged between the stator winding bundles 14. FIG. 3 depicts the enlarged section A of FIG. 1 but with the stator windings 14 removed.

Each divider 16 comprises a longitudinally extended body portion 16a, with an end portion 16b projecting laterally, thus forming a T-shaped panel. The azimuthal extent of the end portion is greater than the azimuthal extent of the body portion 16a, where the width of the end portion is greater than the width of the slot 13 formed by the stator teeth 15, and the width of the body portion 16a is less than the width of the slot 13 formed by the stator teeth 15.

The body portion 16a of the divider 16 extends in the axial direction along the length of the stator. The extent of the divider 16 in the radial direction is significantly less, such that the divider 16 is a long, flat panel.

One or more dividers 16 may be arranged radially within each slot 13 formed by the stator teeth 15. The spacing between the dividers 16 form cavities within each slot 13, within which stator windings 14 can be arranged. Alternatively, the stator windings 14 may be positioned first, with the dividers 16 being inserted after the stator windings 14 to form the cavities.

Figure 4:
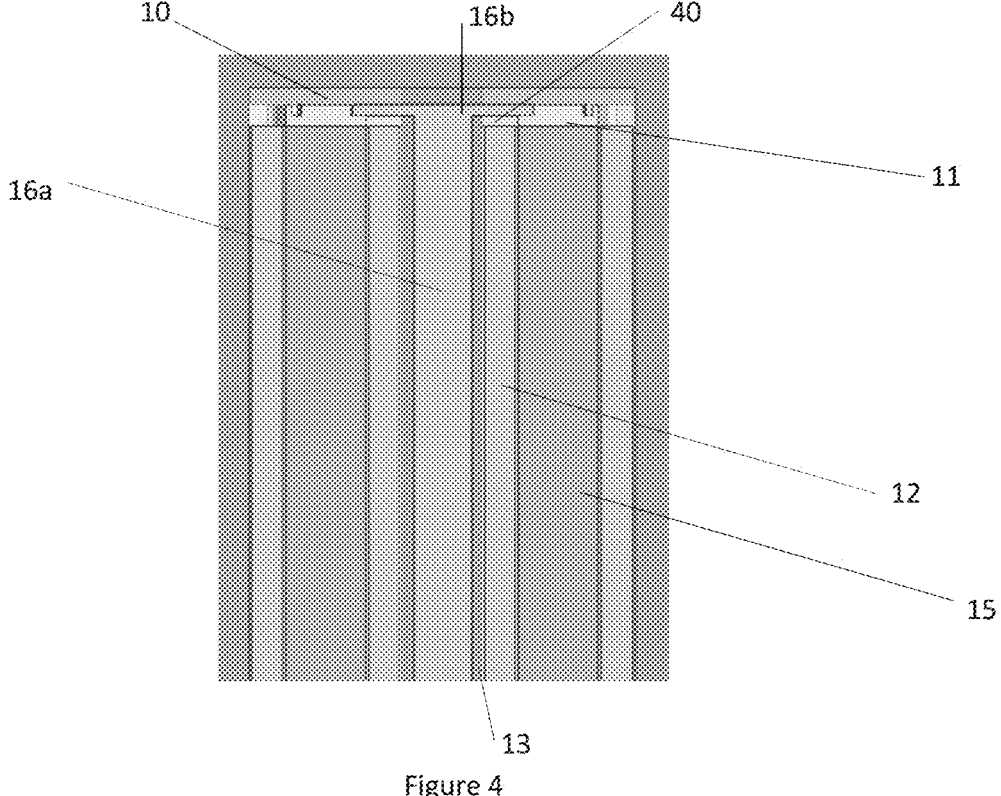
FIG. 4 shows an axial cross-section of an enlarged section of a stator.

FIG. 4 depicts an axial cross-section of an enlarged section of the stator 10. The T-shaped divider 16 is shown between two stator teeth 15, where the stator teeth 15 are surrounded by the spacers 12. The body portion 16a of the divider 16 extends along the length of the stator 10. The end portion 16b of the divider 16 is positioned such that it is in contact with the end cheek.

The end cheeks 11, positioned at each the end of the stator 10, have grooves 40 cut into them in order to receive an end of the divider 16. The grooves 40 are cut into the end cheek to receive either the end portion 16b, or the distal end of the body portion 16a, depending on the arrangement of the dividers 16 within the stator 10.

At the end of the stator proximal to the end portion 16b of the dividers, the grooves 40 cut into the end cheek 11 are the same depth as the axial extent of the end portion 16b of the dividers 16. Therefore, the end cheek 11 is arranged to engage with the end portion 16b of the dividers 16.

Where the end of the body portion of the divider 16a distal to the end portion 16b of the divider 16 is at the end face of the stator 10, the end cheek comprises a complementary groove (not shown) in order to engage with the distal end of the body portion 16a.

This arrangement of grooves 40 in the end cheeks 11 helps to reduce movement of the dividers 16. This in turn helps to reduce movement of the stator windings 14.

The end cheeks 11 may help to prevent any undue mechanical stresses on the stator windings 14 due to the formation of the end of the stator windings 14. Mechanical stresses on the insulation of the windings can cause the insulation to degrade, leading to electrical stress and insulation failures. This can lead to shorting and thus overheating of the motor.

The end cheeks 11 are typically about 1-2 mm thick, and are typically made from an insulating material.

Figure 5:
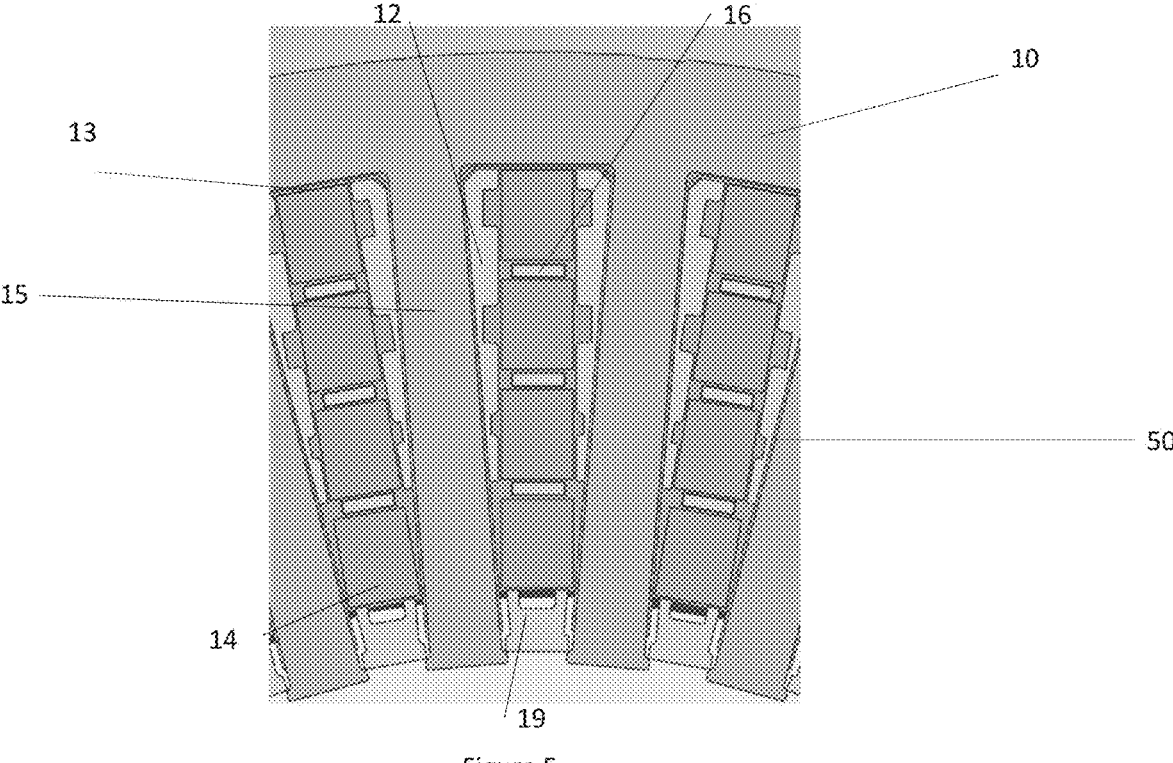
FIG. 5 shows a radial cross-sectional view of an enlarged section of a stator.

FIG. 5 depicts a radial cross-sectional view of an enlarged section of the stator 10. The dividers 16 are between stator winding bundles, where the dividers 16 have a smaller azimuthal extent than the stator winding bundles. However, the azimuthal extent of the dividers 16 may be arranged to be substantially the same as the azimuthal extent of the slot 13.

The dividers 16 may be either placed into the stator slot 13 before, after or during the winding process. This is dependent on the individual stator, for example whether it is a segmented stator or a full stator. Additionally, this could be dependent on whether the windings are chosen to be concentrated or distributed. Alternatively, the dividers 16 may be glued into the stator slot 13 before or after the stator windings 14 are positioned. Positioning the dividers 16 before the stator windings 14 forms cavities in which the stator windings 14 may be placed. This may ease and order the winding process.

The body portion 16a of the divider 16 may extend along the full axial length of the stator 10, such that the dividers 16 are only inserted from one end of the stator 10.

Alternatively, the body portion 16a of the divider 16 may extend along approximately half of the axial length of the stator 10, such that dividers 16 may be inserted from each end of the stator 10. The distal end of the body portion 16a of each divider may engage with another divider in the slot, assembling a continuous divider. In this instance, the distal end of the body portion 16a of the dividers may have a mechanism by which they can engage with the distal end of the opposite dividers. This may be a geometrical arrangement such that the ends slot into each other, or an adhesive to join the ends.

This can help to ease assembly, especially if the stator 10 is particularly large or if the stator windings 14 have already been positioned prior to the insertion of the dividers 16.

The dividers 16 may be integrally formed with the spacers 12, with this divider-spacer integral structure placed or glued into the stator slot 13 before the stator windings 14 are positioned. Furthermore, the dividers 16 and spacers may act as ground-wall insulation, such that it may be possible to eliminate the slot liner 50. The slot liner 50 typically lines the inside of the slot 13 to prevent damage to the stator windings by the teeth.

In a typical electric motor, Litz or shaped bundles of conductors are used for stator windings 14 to reduce high frequency, circulating currents and proximity losses. These stator windings 14 are typically made of malleable wire, threaded through slots 13 between the stator teeth, but may deform during and after positioning due to their malleable nature.

The dividers 16 are positioned such that the stator windings 14 are substantially prevented from deforming radially after being positioned within the stator as they are held in place. Deformation of stator windings 14 may cause adjacent windings to touch. When adjacent groups of windings

14 touch, over time this can cause the insulation of the wires to degrade due to mechanical abrasion from vibration of the wires and temperature cycling.

Without insulation of the wires, the stator windings 14 can short. Placing the dividers 16 between the stator winding bundles 14 may reduce the risk of shorting between stator windings 14 leading to overheating of the motor. This may increase the efficiency and lifetime of the electric machine. Furthermore, the dividers 16 may electrically isolate the stator windings 14 such that the motor may be used for high-voltage applications with a reduced risk of dielectric breakdown.

Additionally, the stator losses consist of core and copper losses, with the most direct method of removing the copper loss being applying flood cooling in the stator slots 13. Directly flooding the stator winding with liquid cooling improves the motor power density of the motor. The heat transfer from the windings is greatly affected by the oil flow rate around the windings, therefore it is preferable to control the oil paths and flow rates around the windings to ensure that cooling is applied across a large part of the surface of the windings. Applying cooling across the windings can reduce overheating, and can result in lower temperatures of the stator windings 14 for given core and copper losses.

The azimuthal extent of the body portion 16a of the dividers 16 may be selected to control the flow of oil between the stator windings 14 and the spacers, and direct the flow of oil between stator winding bundles 14 for optimal heat transfer between the windings and oil. Controlling the size of the flow channel helps to control the coolant velocity. High coolant velocity improves the heat transfer rate between the windings and the coolant fluid.

The dividers 16 may be shaped dependent on the profile of the spacers 12, in order to further control the size of the flow channel and therefore the coolant velocity. A small gap between the divider 16 and spacer 12 allows for oil flow around the edges of the conductors. In an example there is no gap between the divider 16 and spacer 12, providing better electrical insulation and no cooling, depending on the specification of the stator 10.

The dividers 16 may be constructed from non-conducting materials such as ceramic, plastic, and glass composites. In an example, the dividers 16 may be used to provide better means of heat transfer between the windings and the stator assembly.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A stator assembly for an electrical machine, wherein the stator assembly extends azimuthally around an axis, wherein the stator assembly comprises:

a plurality of stator teeth projecting radially from a circumference of the stator assembly, wherein the teeth are spaced azimuthally from each other and extend along a direction parallel to the axis of the stator assembly;

a plurality of slots defined by azimuthal spacing of the stator teeth, wherein the plurality of slots extends along a direction parallel to the axis of the stator assembly, wherein the slots are arranged to receive a plurality of stator windings; and one or more dividers positioned within the plurality of slots, wherein the dividers define a plurality of cavities for receiving the plurality of stator windings, wherein the divider is T-shaped comprising a body portion and an end portion;

wherein the stator assembly further comprises one or more end-cheeks;

wherein the one or more end-cheeks comprise one or more grooves arranged to receive the end portions of the one or more dividers.

2. The stator assembly as claimed in claim 1, wherein the dividers are spaced radially within the slot.

3. The stator assembly as claimed in claim 1, wherein the length of the body portion of the divider extends along the entire axial length of the stator.

4. The stator assembly as claimed in claim 1, wherein the length of the body portion of the divider extends along half of the axial length of the stator.

5. The stator assembly as claimed in claim 1, wherein the width of the body portion of the divider is smaller than the width of the slot.

6. The stator assembly as claimed in claim 1, wherein the end portion of the divider is wider than the slot formed by the stator teeth.

7. The stator assembly as claimed in claim 1, wherein the stator assembly further comprises a spacer located adjacent to one or more of the stator teeth around the edge of the slot.

8. The stator assembly as claimed in claim 7, wherein the dividers are formed integrally with the spacer.

9. The stator assembly as claimed in claim 7, wherein the dividers and/or the spacer are shaped to define one or more channels for the flow of coolant through the slot.

10. The stator assembly of claim 1, wherein the dividers are formed from a non-conducting material.

11. The stator assembly of claim 10, wherein the dividers are formed of plastic, glass composites, or ceramics.

12. The stator assembly as claimed in claim 1, wherein the one or more grooves comprise a step partially cut out of a face of the one or more end cheeks.

13. The stator assembly as claimed in claim 12, wherein one or both ends of each of the one or more dividers are arranged to engage with a complementary groove of the one or more end cheeks.

14. A method of assembling a stator assembly for an electric machine, the method comprising:

providing a plurality of stator teeth projecting radially from a circumference of the stator assembly, wherein the teeth are spaced azimuthally from each other and extend along a direction parallel to the axis of the stator assembly, wherein the azimuthal spacing of the plurality of stator teeth defines a plurality of slots, and wherein the plurality of slots extends along a direction parallel to the axis of the stator assembly;

providing an end cheek on at least one end of the stator, wherein the one or more end-cheeks comprise one or more grooves formed on a face of the end cheeks;

positioning one or more dividers within the plurality of slots, wherein the dividers define a plurality of cavities, wherein the one or more dividers are T-shaped comprising a body portion and an end portion and positioning includes positioning the end portions in the one or more grooves; and inserting a plurality of stator windings into the plurality of cavities, before, during or after the positioning of the one or more dividers, wherein the plurality of dividers substantially separates the plurality of stator windings.

* * * * *